(12) United States Patent
Demtröder

(10) Patent No.: US 8,529,397 B2
(45) Date of Patent: Sep. 10, 2013

(54) GEAR SYSTEM FOR A WIND TURBINE

(75) Inventor: Jens Demtröder, Rønde (DK)

(73) Assignee: Vestas Wind Systems A/S, Aarhus N (DK)

( * ) Notice: Subject to any disclaimer, the term of this patent is extended or adjusted under 35 U.S.C. 154(b) by 330 days.

(21) Appl. No.: 12/227,611

(22) PCT Filed: May 22, 2007

(86) PCT No.: PCT/EP2007/054962
§ 371 (c)(1),
(2), (4) Date: May 7, 2009

(87) PCT Pub. No.: WO2007/135156
PCT Pub. Date: Nov. 29, 2007

(65) Prior Publication Data
US 2009/0221397 A1    Sep. 3, 2009

(30) Foreign Application Priority Data

May 22, 2006   (DK) .................................. 2006 00700

(51) Int. Cl.
*F16H 57/08*   (2006.01)
(52) U.S. Cl.
USPC ......................................................... 475/331
(58) Field of Classification Search
USPC ......... 74/325, 331, 332, 353, 354; 290/40 C, 290/44, 55; 475/149, 150, 182, 191, 331, 475/332, 5, 338, 339; 416/170 R
See application file for complete search history.

(56) References Cited

U.S. PATENT DOCUMENTS

| | | | | |
|---|---|---|---|---|
| 1,350,522 A | * | 8/1920 | Royce | 74/606 R |
| 1,366,325 A | * | 1/1921 | Perin | 475/338 |
| 1,495,238 A | * | 5/1924 | Anglada | 475/338 |
| 1,632,123 A | * | 6/1927 | Else | 475/296 |
| 1,856,529 A | * | 5/1932 | Zerbi | 416/170 R |
| 2,223,413 A | * | 12/1940 | Gasser | 475/326 |
| 2,401,875 A | * | 6/1946 | Lawler | 475/342 |
| 2,722,851 A | * | 11/1955 | Steiner | 475/270 |
| 2,759,376 A | * | 8/1956 | Chamberlin et al. | 475/338 |

(Continued)

FOREIGN PATENT DOCUMENTS

| DE | 723405 | 8/1942 |
|---|---|---|
| DE | 103 18 945 B3 | 10/2004 |

(Continued)

*Primary Examiner* — Troy Chambers
*Assistant Examiner* — Michael Gonzalez
(74) *Attorney, Agent, or Firm* — Wood, Herron & Evans, LLP

(57) ABSTRACT

A gear system (1) comprising a main bearing (3), a main gear (5) and two or more pinion shafts (6). The main bearing (3) directly supports a torque inputting means (2) and defines a rotational axis (4). The pinion shafts (6) are each arranged to mesh with the main gear (5) at an exterior surface (7) of the main gear (5) in such a manner that torque transmitted from the main gear (5) is split into a number of parallel torque paths corresponding to the number of pinion shafts (6). At least the main gear (5), and at least part of its meshes to the pinion shafts (6) are arranged within a perimeter defined by the main bearing (3). The gear system (1) is compact due to the arrangement of the main gear (5) and meshes to the pinion shafts (6). At the same time it is easy and cost effective to manufacture because the pinion shafts (6) mesh to the main gear (5) via the external surface (7).

10 Claims, 2 Drawing Sheets

(56) References Cited

U.S. PATENT DOCUMENTS

| | | | |
|---|---|---|---|
| 3,245,279 A * | 4/1966 | Baker | 74/410 |
| 3,705,522 A * | 12/1972 | Ogawa | 475/341 |
| 3,792,629 A * | 2/1974 | Applebury | 475/342 |
| 3,939,736 A * | 2/1976 | Morin | 475/338 |
| 4,043,216 A * | 8/1977 | Steer | 74/410 |
| 4,183,266 A * | 1/1980 | Osumi | 475/337 |
| 4,251,987 A * | 2/1981 | Adamson | 60/805 |
| 4,280,376 A * | 7/1981 | Rosen | 475/342 |
| 4,590,820 A * | 5/1986 | Hambric | 74/640 |
| 4,759,235 A * | 7/1988 | Hiramitsu et al. | 475/339 |
| 4,788,891 A * | 12/1988 | Katori | 475/17 |
| 4,871,923 A * | 10/1989 | Scholz et al. | 290/55 |
| 4,954,123 A | 9/1990 | Kurywczak | |
| 4,964,315 A * | 10/1990 | Willis, Jr. | 74/665 GA |
| 5,269,734 A * | 12/1993 | Menge, Sr. | 475/339 |
| 5,376,057 A * | 12/1994 | Cooper et al. | 475/248 |
| 5,435,794 A * | 7/1995 | Mori et al. | 475/343 |
| 5,692,989 A * | 12/1997 | Kamlukin | 475/346 |
| 6,304,002 B1 * | 10/2001 | Dehlsen et al. | 290/1 C |
| 6,420,808 B1 * | 7/2002 | Hosle | 310/83 |
| 6,459,165 B1 * | 10/2002 | Schoo | 290/1 C |
| 6,537,169 B1 * | 3/2003 | Morii | 475/8 |
| 6,790,156 B2 * | 9/2004 | Hosle | 475/331 |
| 6,811,514 B2 * | 11/2004 | Bowman | 475/338 |
| 6,872,049 B2 * | 3/2005 | Christensen | 415/124.1 |
| 6,887,179 B2 * | 5/2005 | Yamashita et al. | 475/338 |
| 7,011,598 B2 * | 3/2006 | Flamang et al. | 475/331 |
| 7,069,802 B2 * | 7/2006 | Mikhail et al. | 74/410 |
| 7,090,465 B2 * | 8/2006 | Flamang et al. | 416/170 R |
| 7,291,088 B2 * | 11/2007 | Arndt et al. | 475/331 |
| 7,335,128 B2 * | 2/2008 | Flamang et al. | 475/331 |
| 7,377,875 B2 * | 5/2008 | Shiina et al. | 475/339 |
| 7,560,824 B2 * | 7/2009 | Hehenberger | 290/44 |
| 7,614,976 B2 * | 11/2009 | Smook et al. | 475/331 |
| 7,678,004 B2 * | 3/2010 | Yamanaka et al. | 475/30 |
| 7,828,682 B2 * | 11/2010 | Smook | 475/5 |

FOREIGN PATENT DOCUMENTS

| | | |
|---|---|---|
| EP | 1 316 739 B1 | 8/2004 |
| WO | WO 01/48395 A1 | 7/2001 |
| WO | WO 01/57415 A2 | 8/2001 |
| WO | WO 02/14690 A1 | 2/2002 |
| WO | WO 03/014567 A1 | 2/2003 |
| WO | WO 2004/015267 A1 | 2/2004 |
| WO | WO 2005/050058 A1 | 6/2005 |

\* cited by examiner

GEAR SYSTEM FOR A WIND TURBINE

FIELD OF THE INVENTION

The present invention relates to a gear system which is relatively compact, and which is relatively easy and cost effective to manufacture. The gear system of the present invention is well suited for use in a turbine, in particular a wind turbine. The present invention further relates to a gearbox and to a turbine with such a gear system.

BACKGROUND OF THE INVENTION

There is an increasing demand for wind turbines delivering an increasing power level. This may lead to an increase in the size and the weight of the wind turbines as well. This, however, constitutes a problem in terms of construction and maintenance of the wind turbines. It is, therefore, desirable to construct larger turbines, i.e., with an increased power level, without thereby increasing the dimensions of the turbine correspondingly.

One way of obtaining this is disclosed in WO 02/14690 disclosing a drive assembly for a wind turbine comprising a rotor hub and a planetary type gear transmission unit comprising sun, planet and ring gears, and a planet carrier. The ring gear is non-rotatably secured to a supporting structure, for example, a turbine nacelle, and a main bearing rotatably supports the rotor hub and planet carrier relative to the ring gear and supporting structure. The sun, planet and ring gears may lie in a transverse plane (perpendicular to the rotation axis of the rotational forces) which also contains the main bearing. Thereby, a compact drive assembly is provided.

It is a disadvantage of this drive assembly that it is relatively difficult and costly to manufacture the drive assembly, partly because the manufacture of the ring gear, being adapted to mesh with the planet gears on an inner surface, is relatively difficult and costly to manufacture. Furthermore, the existing production techniques for such ring gears put a restrain on the possible choice of materials in such a manner that it will normally be necessary to choose more expensive materials. Another disadvantage is that the transverse loads acting on the main bearing deflect the ring gear, and thereby directly disturbs the gear contact. Furthermore, deflections of the supporting structure of the drive assembly also deflect the ring gear, which is solidly bolted to the supporting structure. This also disturbs the gear contact.

Another example of a prior art drive assembly is described in WO 2004/015267, disclosing a wind turbine gear unit comprising a low speed gear module and a plurality of high speed gear modules. The low speed gear module is operable simultaneously to transmit torque to each of the high speed gear modules. The low speed gear module may be either a bull gear or a ring wheel. When using a ring wheel as the low speed gear element the main bearing of the rotor may be situated on the outer diameter of the ring wheel, thereby providing a compact gear unit as described in WO 02/14690. However, this is not possible if a bull gear is used as the low speed gear element, and it is therefore necessary to balance the need for a compact gear unit against the need for a gear unit which is easy and cost effective to manufacture. This is a disadvantage.

Yet another example of a conventional planet gear system is disclosed in WO 02/14690 or DE 103 18 94. In the gear system disclosed in these references each of the planet gears has two tooth meshes, one towards the ring gear and one towards the sun. The tooth forces in these two contacts have opposite direction. This causes alternating bending loads on the planet gear with every revolution. This is a disadvantage because it reduces the capacity of the planet gears.

SUMMARY OF THE INVENTION

It is, thus, an object of the invention to provide a gear system which is relatively compact as well as easy and cost effective to manufacture.

It is a further object of the invention to provide a gear system to which it is possible to provide service while it is positioned in a turbine, and in an easy, safe and efficient manner.

It is an even further object of the invention to provide a gearbox which is relatively compact as well as easy and cost effective to manufacture.

It is an even further object of the invention to provide a gearbox to which it is possible to provide service while it is positioned in a turbine, and in an easy, safe and efficient manner.

It is an even further object of the invention to provide a turbine, in particular a wind turbine, having a gearbox which is relatively compact as well as easy and cost effective to manufacture.

It is an even further object of the invention to provide a turbine, in particular a wind turbine, having a gearbox, and in which it is possible to provide service to the gearbox without removing it from the turbine, and in an easy, safe and efficient manner.

According to a first aspect of the invention the above and other objects are fulfilled by providing a gear system comprising:
  a main bearing directly supporting a torque inputting means and defining a rotational axis,
  a main gear, and
  two or more pinion shafts, each being arranged to mesh with the main gear at an exterior surface of the main gear in such a manner that torque transmitted from the main gear is split into a number of parallel torque paths, said number corresponding to the number of pinion shafts, and each pinion shaft being supported by a pinion supporting structure,
wherein at least the main gear and at least part of its meshes to the pinion shafts are arranged within a perimeter defined by the main bearing.

The torque inputting means is a part of the gear system through which torque is input into the system, either directly or via a connecting hub, shaft or tube. It may, for example, be or comprise a rotor. The torque may be provided by any suitable kind of torque generating means, such as a sprocket, a drum, an external (open) gear system, or a set of blades driven by a fluid current, such as wind or water streams.

The torque inputting means is directly supported by the main bearing. Thus, the torque inputting means rotates in the main bearing, thereby inputting torque to the gear system, and thereby defining a rotational axis.

The main gear and the two or more pinion shafts are adapted to mesh at an exterior surface of the main gear. This is contrary to the situation where the main gear is a ring gear, i.e., a gear being adapted to mesh with one or more pinion shafts on an interior surface of the gear. This is an advantage because a gearwheel which is adapted to mesh via an exterior surface is much easier and more cost effective to manufacture than a gear wheel which is adapted to mesh via an interior surface. Furthermore, the manufacturing techniques for such gearwheels significantly reduce the requirements to the applied materials, for example, in terms of strength and/or durability, and less expensive materials may accordingly be used, thereby even further reducing the manufacturing costs.

The two or more pinion shafts are arranged to mesh with the main gear in such a manner that torque transmitted from the main gear is split into a number of parallel torque paths. The number of parallel torque paths corresponds to the number of pinion shafts. Thus, the torque which is input to the system by means of the torque inputting means travels through the system via parallel torque paths defined by the pinion shafts. Thereby the load is shared among the pinion shafts.

Furthermore, the pinion shafts may be arranged in an evenly distributed manner with respect to a plane arranged substantially transverse to longitudinal directions defined by the pinion shafts. Alternatively, the pinion shafts may be arranged asymmetrically with respect to such a plane. Furthermore, the pinion shafts may be grouped, and these groups of pinion shafts may be arranged in an evenly distributed manner or asymmetrically with respect to such a plane.

Each of the pinion shafts is supported by a pinion supporting structure. In the present context, the term 'pinion supporting structure' should be interpreted to mean an element which supports one or more pinion shafts. It may, for example, be in the form of a pinion cage, a gear housing, a gear frame or a gear carrier.

It is an advantage of the gear system of the invention that the pinion shafts do not have two tooth meshes as it is the case in the gear system disclosed in WO 02/14690 or DE 103 18 945 as described above. Thereby, the problem related to tooth forces having opposite directions is avoided, and the capacity of each of the pinion shafts is thereby increased considerably. Thereby, the gear system of the present invention provides efficient use of the material, and this is an advantage in relation to reliability as well as cost efficiency.

At least the main gear and at least part of its meshes to the pinion shafts are arranged within a perimeter defined by the main bearing. Thus, the main gear and at least part of its meshes, preferably all of its meshes, to the pinion shafts are arranged and shaped in a very compact manner. Accordingly, a very compact gear system has been provided. Simultaneously, the gear system is easy and cost effective to manufacture as described above. This is very advantageous.

The bearings used in the gear system of the invention may be any suitable kind of bearings, including roller bearings, ball bearings, sleeve bearings, single-row bearings, multi-row bearings, and/or any other suitable kind of bearings. Furthermore, one or more of the mentioned kinds of bearings may be applied. Furthermore, each of the bearings may be arranged with a rotating outer ring or with a rotating inner ring, depending on the arrangement of the bearing in question.

Similarly, the gears used in the gear system of the invention may be any suitable kind of gear, including helical gears, spur gears, double helix gears, herringbone gears, and/or any other suitable kinds of gears. Furthermore, one or more of the mentioned kinds of gears may be applied at various gear connections of the gear system.

The gear system may further comprise at least two independent pinion supporting structures, each pinion shaft being supported by one of the pinion supporting structures. According to this embodiment, the pinion supporting structures are movable relative to each other to a certain extent, thereby providing an additional degree of freedom for ensuring an at least substantially even load distribution among the torque paths defined by the pinion shafts. It should be understood that the pinion supporting structures are not able to move completely independently of each other. Thus, the angular distribution of the pinion supporting structure with respect to the rotational axis defined by the main bearing is preferably at least substantially fixed, while the pinion supporting structures are movable, to a certain extent, relative to each other in a direction along the rotational axis, or in a radial direction perpendicular to the rotational axis. In one embodiment the number of pinion supporting structures is equal to the number of pinion shafts, i.e., each pinion shaft is supported by a pinion supporting structure which supports that pinion shaft only.

Alternatively, one or more of the pinion supporting structures may support two or more pinion shafts.

Alternatively, all of the pinion shafts may be supported by a common pinion supporting structure.

The main gear may be rotationally decoupled from the torque inputting means. In this case the main gear does not rotate along with the torque inputting means, and it may be at least substantially stationary. Alternatively, the main gear may be adapted to perform rotational movements, but these rotational movements will be independent of the rotational movements performed by the torque inputting means. For instance, the main gear may rotate at a different, preferably lower, speed than the torque inputting means, or even in an opposite direction than the torque inputting means. This lowers the strain on the gear connections as compared to the situation where the main gear is at least substantially stationary. Furthermore, according to this embodiment, and in the case that the pinion shafts are supported by a common pinion supporting structure, the common pinion supporting structure is preferably adapted to rotate along with the torque inputting means.

In a further variant of the embodiment described above, the main gear is substantially stationary during normal operation. The shaft or structure supporting the main gear may in this variant be connected to a torque limiting device, for example a friction clutch, which allows the main gear to rotate with the torque inputting means in case the torque on the main gear exceeds the predefined setting of the torque limiter. This may, for example, effectively protect the gear system against changes of the external loads, such as gusts in a wind turbine.

Alternatively, the main gear may be rotationally locked to the torque inputting means, the main gear thereby being adapted to rotate along with the torque inputting means. In this case the pinion supporting structure(s) is/are preferably rotationally decoupled from the torque inputting means, and it/they may be at least substantially stationary, or it/they may be adapted to perform rotational movements which are independent of the rotational movements performed by the torque inputting means, similarly to the situation described above.

In the case that the pinion supporting means is at least substantially stationary relative to a major supporting structure, such as a nacelle of a wind turbine, all of the pinion shaft will be readily accessible, for example, from the exterior of a housing enclosing the gear system. This facilitates supplying of lubricant to the gear contacts and the bearings of the gear system. Furthermore, this arrangement allows for easy service to all of the pinion shafts. Thereby, the pinion may, for example, be replaced without having to remove the entire gear system from the installation, such as a wind turbine, where it is positioned. This reduces maintenance costs considerably, in particular in the case where the installation is positioned at a site which is not readily accessible, such as an offshore wind farm.

Each of the pinion shafts may be adapted to mesh, directly or indirectly, with a gearwheel connected to a common drive shaft, the common drive shaft being arranged at least substantially concentric to the rotational axis of the main bearing. In the present context, the term 'meshing indirectly' should be interpreted in such a manner that the connection between a relevant pinion shaft and the gearwheel is established via one or more additional gear components, such as additional gearwheels and/or additional pinion shafts. According to this embodiment, the torque which travels through the system via the parallel torque paths is eventually transferred to the common drive shaft. Thus, the gear system may be, or form part of, a three-way epicyclic gear arrangement.

Alternatively, the pinion shafts may form torque transmitting connections, directly or indirectly, to two or more drive shafts, the two or more drive shafts being arranged at least substantially parallel to each other and to the rotational axis of the main bearing. According to this embodiment, the torque which travels through the system is transferred to and shared between the two or more drive shafts. Thus, the output torque of the system leaves the system via a number of parallel drive shafts. Each of these drive shafts may, for example, be connected to a generator. Alternatively, the parallel drive shafts may be connected to an additional gear stage.

Each of the pinion shafts may be connected, directly or indirectly, to an individual drive shaft. In this case, the number of pinion shafts is equal to the number of drive shafts.

The main gear may be mounted in such a manner that it is capable of accommodating at least substantially even load sharing between the pinion shafts, and/or at least substantially even load distribution along the facewidth of each of the pinion shafts. One possible way of obtaining this is to allow the main gear to freely find its radial and angular position until the forces in all meshes between the main gear and the pinion shafts are at least substantially in equilibrium. This may, for example, be obtained by designating the structure supporting the main gear in such a manner that it is torsionally stiff, but at the same time capable of flexing in a radial and/or in an angular direction. Another way to realize this is arranging a coupling between the structure supporting the main gear and the main gear, for example, a cardanic joint.

The main gear and the pinion shafts may form or form part of a first gear stage, the gear system further comprising a second gear stage being connected to the first gear stage. According to this embodiment the gear system comprises two or more gear stages. The connection between the first gear stage and the second gear stage may be established by means of a ring gear. Alternatively, the connection between the first gear stage and the second gear stage may be established by means of any other suitable means, such as one or more gearwheels adapted to mesh via an outer surface.

Alternatively, the gear system may comprise only one gear stage which is directly connected to one or more generators.

In a preferred embodiment, the torque inputting means may be or comprise a rotor. Thus, the gear system is preferably suited for use in a power generating apparatus, such as a turbine, i.e., the gear system is preferably a speed increasing gear system.

According to one embodiment, the main bearing, the main gear, and at least part of the meshes between the main gear and the pinion shafts may be arranged at least substantially in the same transverse plane. According to this embodiment, the main bearing encloses the main gear and the pinion shafts. Thereby, a very compact gear system is provided. Furthermore, this arrangement of the gear meshes relative to the main bearing reduces the impact of overhang loads on the load distribution in the gear contacts. Thereby, this embodiment represents a very competitive and reliable gear system which is minimally impaired by its environment. This is very advantageous.

According to a second aspect of the invention, the above and other objects are fulfilled by providing a gearbox comprising a gear system according to the first aspect of the invention. The gearbox may comprise one or more gear stages as described above.

According to a third aspect of the invention, the above and other aspects are fulfilled by providing a turbine comprising a rotor driven by a fluid current, a gearbox according to the second aspect of the invention, and a generator. The turbine may comprise only one generator, or it may comprise two or more generators as described above.

The turbine is preferably a wind turbine, but it may, alternatively, be a water driven turbine.

BRIEF DESCRIPTION OF THE DRAWINGS

The invention will now be described in further details with reference to the accompanying drawings in which.

DETAILED DESCRIPTION OF THE DRAWINGS

Figure 1:
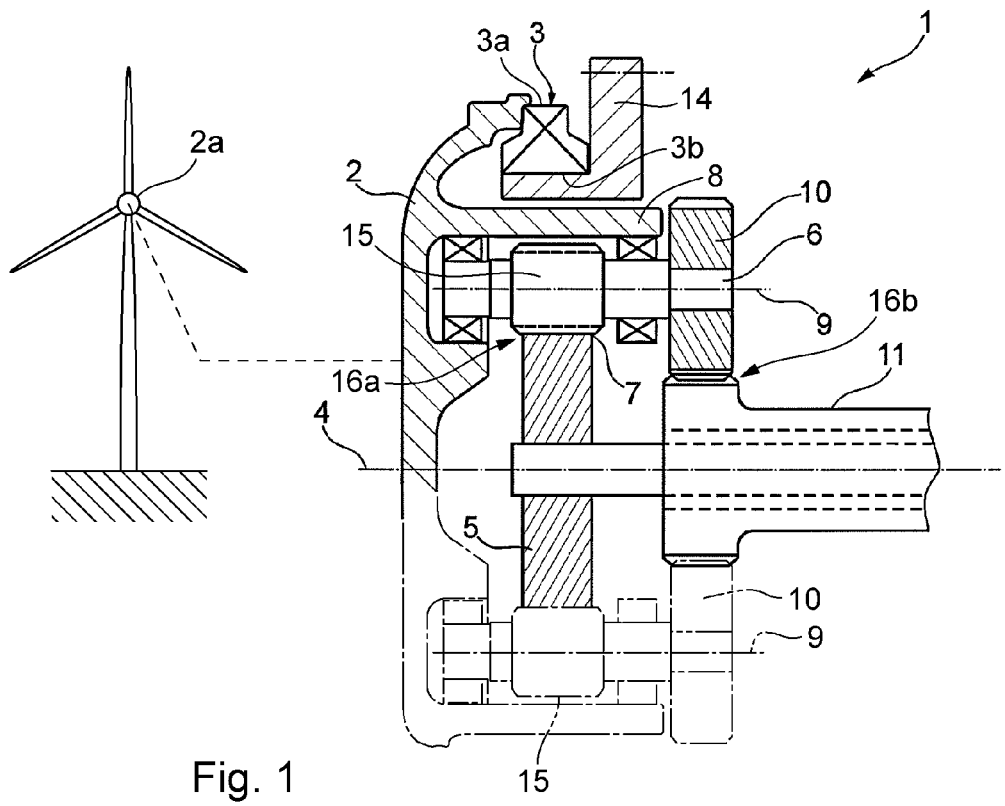
FIG. 1 is a cross sectional view of part of a gear system according to a first embodiment of the invention.

FIG. 1 is a cross sectional view of part of a gear system 1 according to a first embodiment of the invention. The gear system 1 comprises a rotating component 2 being directly supported by a main bearing 3, and being adapted to rotate about a first rotational axis 4. As shown in FIG. 1, the main bearing 3 includes a radially outer surface 3*a* engaging the rotating component 2 and facing away from the first rotational axis 4, and also includes a radially inner surface 3*b* engaging a non-rotating component 14 (shown as a separate element in FIG. 1, but described in other embodiments below as a portion of a pinion supporting structure or cage) and facing towards the first rotational axis 4. The rotating component 2 is rotationally coupled to a rotor 2*a*, i.e. it rotates along with the rotor 2*a*. The gear system 1 further comprises a main gear 5 which is rotationally decoupled from the rotating component 2, i.e. it does not rotate along with the rotating component 2 about the first rotational axis 4. The main gear 5 is adapted to mesh with a number of pinion shafts 6 via an outer surface 7 of the main gear 5. More specifically, FIG. 1 illustrates that the pinion shafts 6 include a first gear wheel 15 in meshed engagement with the outer surface 7 of the main gear 5. In FIG. 1 only one pinion shaft 6 is shown, but it should be understood that at least two pinion shafts 6 will be present.

The pinion shafts 6 are supported by a pinion supporting structure in the form of a pinion cage 8 which is adapted to rotate along with the rotating component 2 about the first rotational axis 4. In the embodiment of FIG. 1 the pinion cage 8 forms an integral part of the rotating component 2. Thereby the pinion shafts 6 also rotate along with the rotational component 2 about the first rotational axis 4. Since the main gear 5 does not rotate along with the rotating component 2, and since the main gear 5 and the first gear wheels 15 of the pinion shafts 6 mesh, each of the pinion shafts 6 is thereby caused to rotate about an individual pinion shaft rotational axis 9.

The pinion shafts 6 are each provided with a second gear wheel 10 which rotates along with the pinion shaft 6 about the rotational axis 9. Each of the second gear wheels 10 is adapted to mesh with a sun wheel 11. The rotation of the second gear wheels 10 and the mesh between the second gear wheels 10 and the sun wheel 11 causes the sun wheel 11 to perform a rotational movement about the first rotational axis 4. Therefore, the main gear 5 and the first gear wheels 15 of the pinion shafts 6 form part of a first gear stage 16a, while the sun wheel 11 and the second gear wheels 10 of the pinion shafts 6 form part of a second gear stage 16b.

It is clear that in the gear system 1 shown in FIG. 1 the main gear 5 and its meshes to the first gear wheels 15 of the pinion shafts 6 are positioned within a perimeter defined by the main bearing 3, and that the main bearing 3, the main gear 5 and its meshes to the first gear wheels 15 of the pinion shafts 6 are positioned in the same transverse plane. Thereby a very compact gear system 1 is provided. Furthermore, since the main gear 5 is adapted to mesh with the first gear wheels 15 of the pinion shafts 6 via the outer surface 7, the main gear 5 is much easier and cost effective to manufacture than would be the case if a ring gear was used. This has been described above.

Furthermore, the torque, which is provided by the rotor, travels through the gear system 1 via independent parallel torque paths defined by the pinion shafts 6. Thereby, the load is shared between these parallel torque paths. This is advantageous since the load applied to each of the components is reduced, and thereby the wear on the components is reduced.

It is possible to rotationally decouple the pinion shafts 6 and the second gear wheels 10. Thus, assembly of the gear system 1 may be performed in the following manner. Since the main gear 5 is rotationally fixed, the pinion shafts 6 need to be mounted in such a manner relative to the main gear 5 that teeth of the main gear 5 and the teeth of each of the pinion shafts 6 mesh in an appropriate manner. Once this is obtained, the second gear wheels 10 can be rotated to provide appropriate meshing between the teeth of the second gear wheels 10 and the teeth of the sun wheel 11. Afterwards the pinion shafts 6 and their respective second gear wheels 10 are locked rotationally in order to allow them to rotate together during normal operation of the gear system 1.

Figure 2:
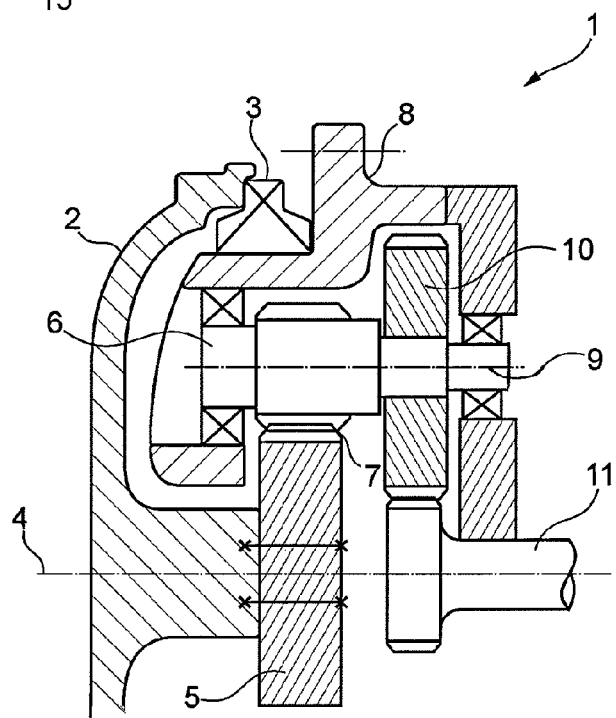
FIG. 2 is a cross sectional view of part of a gear system according to a second embodiment of the invention.

FIG. 2 is a cross sectional view of part of a gear system 1 according to a second embodiment of the invention. Similarly to the gear system of FIG. 1 the gear system 1 of FIG. 2 comprises a rotating component 2 which is directly supported by a main bearing 3, and which is adapted to rotate along with a rotor about a first rotational axis 4. The gear system 1 further comprises a main gear 5 adapted to mesh with a number of pinion shafts 6 via an outer surface 7 of the main gear 5. In FIG. 2 only one pinion shaft 6 is shown, but as explained above with reference to FIG. 1, it should be understood that at least two pinion shafts 6 will be present. The pinion shafts 6 are supported by a pinion cage 8.

In the gear system 1 shown in FIG. 2, the main gear 5 rotates along with the rotating component 2 about the first rotational axis 4, while the pinion cage 8 is roationally decoupled from the rotating component 2. In the embodiment of FIG. 2, the pinion cage 8 is at least substantially stationary. However, other arrangements could be envisaged where the pinion cage 8 rotates at a different rotational speed than the rotational speed of the rotating component 2. This has already been described above.

When the rotating component 2, and thereby the main gear 5, rotates about the first rotational axis 4, and due to the mesh between the main gear 5 and the pinion shafts 6, each of the pinion shafts 6 will be caused to perform a rotational movement about an individual pinion shaft rotational axis 9.

The pinion shafts 6 are each provided with a second gear wheel 10. When a pinion shaft 6 rotates about the corresponding rotational axis 9, the corresponding second gear wheel 10 rotates along. Each of the second gear wheels 10 is adapted to mesh with a sun wheel 11. Accordingly, as the second gear wheels 10 rotate about their respective rotational axis 9, the sun wheel 11 will be caused to perform a rotational movement about the first rotational axis 4.

Thus, the gear system 1 of FIG. 2 is very similar to the gear system of FIG. 1. However, in this case the main gear 5 rotates along with the rotating component 2 while the pinion cage 8 remains substantially stationary.

In the embodiment of FIG. 2, it is also possible to decouple the pinion shafts 6 and the second gear wheels 10 as described above. Thus, assembly of the gear system 1 may be performed in the following manner. Since the pinion cage 8 is rotationally fixed, the main gear 5 must be mounted in such a manner relative to the pinion shafts 6 that teeth of the main gear 5 and teeth of each of the pinion shafts 6 mesh in an appropriate manner. This is obtained by rotating the pinion shafts 6 about their respective pinion shaft rotational axes 9 during mounting of the main gear 5. Once this is done, the second gear wheels 10 can be rotated to provide appropriate meshing between the teeth of the second gear wheels 10 and the teeth of the sun wheel 11. Afterwards, the pinion shafts 6 and their respective second gear wheels 10 are locked rotationally in order to allow them to rotate together during normal operation of the gear system 1.

Figure 3:
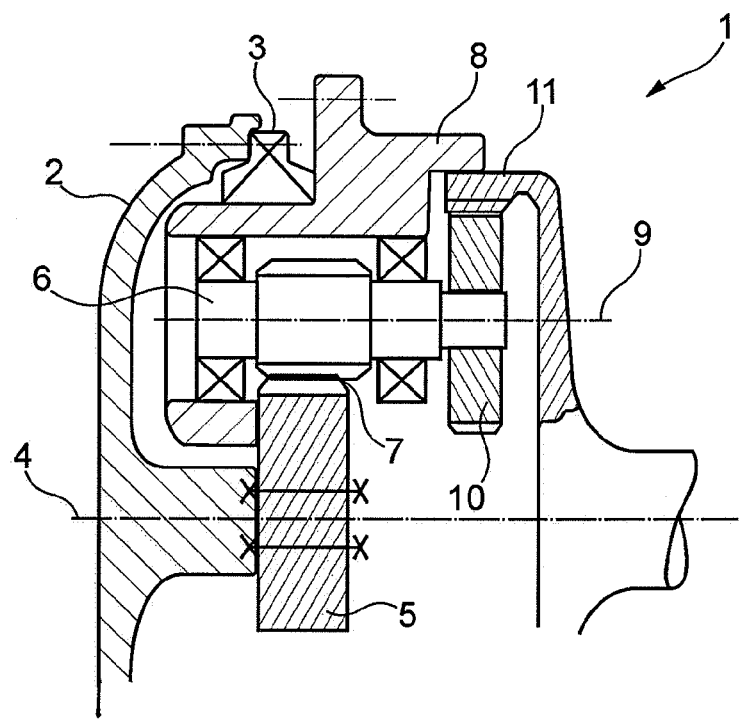
FIG. 3 is a cross sectional view of part of a gear system according to a third embodiment of the invention.

FIG. 3 is a cross sectional view of part of a gear system 1 according to a third embodiment of the invention. The gear system 1 of FIG. 3 is very similar to the gear system of FIG. 2, and the operation of the gear system 1 will therefore not be described in further detail here. Thus, the gear system 1 of FIG. 3 differs from the gear system of FIG. 2 only in that the second gear wheels 10 and the sun wheel 11 mesh via an inner surface 12 of the sun wheel 11. Thus, the sun wheel 11 is in the form of a ring gear.

Figure 4:
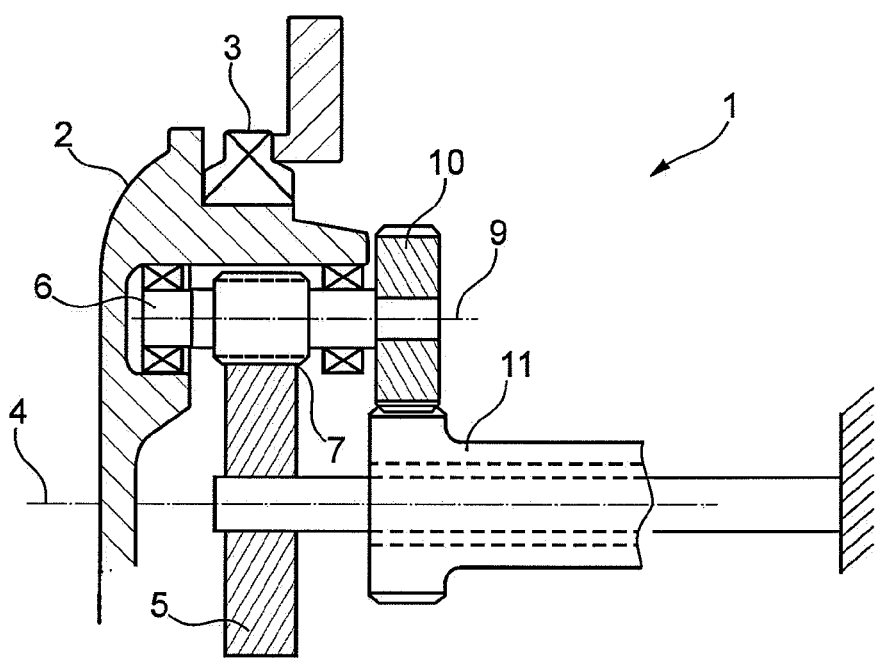
FIG. 4 is a cross sectional view of part of a gear system according to a fourth embodiment of the invention.

FIG. 4 is a cross sectional view of part of a gear system 1 according to a fourth embodiment of the invention. The gear system 1 of FIG. 4 is very similar to the gear system of FIG. 1, and the operation of the gear system 1 will therefore not be described in further detail here. Thus, the gear system 1 of FIG. 4 differs from the gear system of FIG. 1 only in that the main bearing 3 is held at an outer ring of the gear system 1, while an inner ring of the gear system 1 rotates during operation.

The gear systems 1 shown in FIGS. 1-4 are all suitable for use in a turbine, such as a wind turbine. The gear systems 1 may constitute the entire gear system of such a turbine. Alternatively, the gear systems 1 may form a first gear stage, and the sun wheel 11 will in this case form a connection to the second gear stage of the gear system.

The invention claimed is:

1. A gear system for a wind turbine, comprising:
  a rotating component configured to input torque into the gear system for causing rotation about a rotational axis;
  a main bearing having a radial outer surface facing away from the rotational axis and engaging the rotating component for directly supporting the rotating component and a radial inner surface facing towards the rotational axis and engaging a non-rotating portion of the gear system;
  a main gear positioned within the main bearing, the main gear being rotationally decoupled from the rotating component;
  at least two pinion shafts each including a first pinion gear wheel meshed with the main gear, each pinion shaft having a second pinion gear wheel mounted thereon;
  at least one pinion supporting structure for supporting the at least two pinion shafts, the at least one pinion supporting structure being fixedly coupled to and/or integral with the rotating component such that the at least one pinion supporting structure rotates with the rotating component; and a sun wheel meshed with the second pinion gear wheels, wherein the second pinion gear wheels cause the sun wheel to rotate about the rotational axis, wherein the main gear and the meshes between the main gear and the first pinion gear wheels of the pinion shafts are positioned completely within a perimeter defined by the main bearing.

2. The gear system of claim 1, wherein the first pinion gear wheels of the pinion shafts are configured to mesh with an outer surface of the main gear.

3. The gear system of claim 1, wherein the main gear is configured to be substantially stationary.

4. The gear system of claim 1, wherein the main gear is configured to rotate at a lower speed than the rotating component.

5. The gear system of claim 1, wherein the main gear is configured to rotate in an opposite direction than the rotating component.

6. The gear system of claim 1, wherein the pinion shafts are supported by a single, common pinion supporting structure, the common pinion supporting structure being adapted to rotate along with the rotating component.

7. The gear system of claim 1, wherein the main gear and the pinion shafts form at least a part of a first gear stage, and the gear system further comprising at least a second gear stage connected to the first gear stage.

8. The gear system of claim 1, wherein the at least two pinion shafts are completely within the perimeter defined by the main bearing.

9. The gear system of claim 1, wherein the rotating component includes a rotor.

10. The gear system of claim 1, wherein the main bearing, the main gear, and the meshes between the main gear and the first pinion gear wheels of the pinion shafts are at least substantially positioned in a common transverse plane.

\* \* \* \* \*